Nov. 10, 1936.  S. E. NEWHOUSE  2,060,521
ELECTRIC VEHICLE
Filed Oct. 18, 1934  2 Sheets-Sheet 1
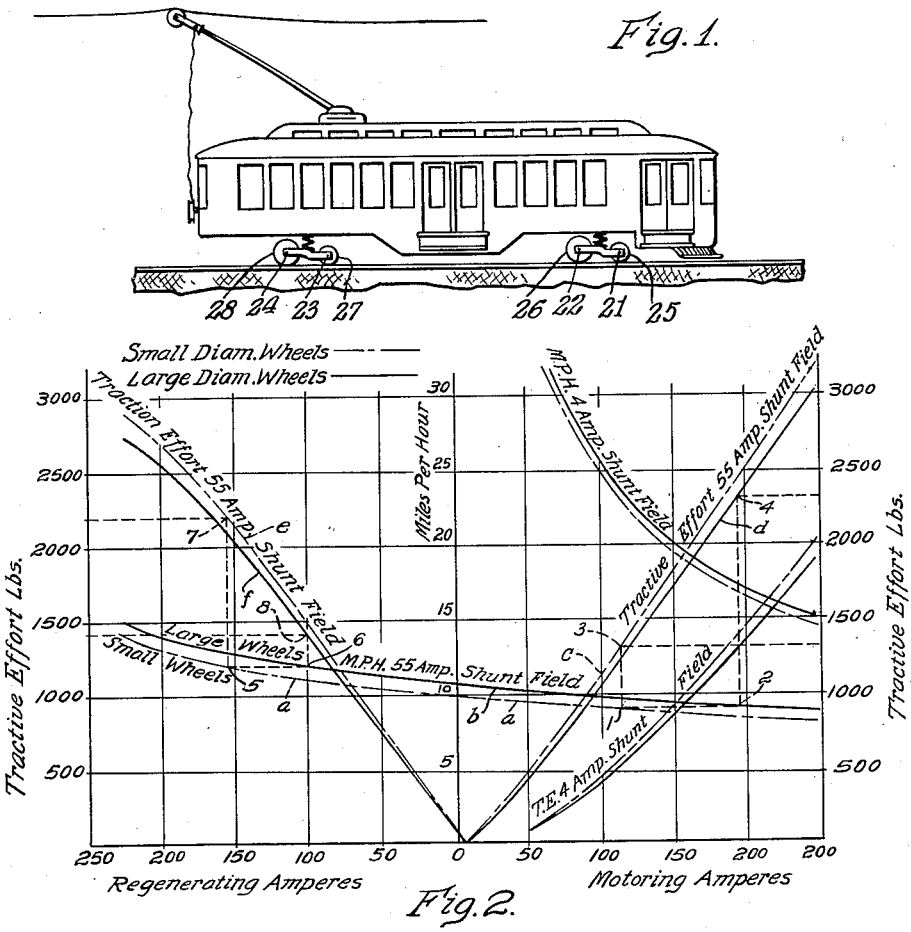

Nov. 10, 1936.  S. E. NEWHOUSE  2,060,521
ELECTRIC VEHICLE
Filed Oct. 18, 1934   2 Sheets-Sheet 2

WITNESSES:

INVENTOR
Simeon E. Newhouse
BY
ATTORNEY

Patented Nov. 10, 1936

2,060,521

UNITED STATES PATENT OFFICE 2,060,521

ELECTRIC VEHICLE

Simeon E. Newhouse, Forest Hills, Pittsburgh, Pa., assignor to Westinghouse Electric & Manufacturing Company, East Pittsburgh, Pa., a corporation of Pennsylvania Application October 18, 1934, Serial No. 748,881

9 Claims. (Cl. 105—61)

My invention relates, in general, to vehicles and, more particularly, to vehicles which are propelled by electric motors.

In order to obtain the maximum tractive effort from a motor driven vehicle, it is necessary to compensate for weight transfer during the starting and acceleration of the vehicle, and also during deceleration of the vehicle in the event that some type of electrical braking is utilized to stop the vehicle. Unless some kind of weight transfer compensation is provided, wheel slippage is encountered during the acceleration of the vehicle as a result of the tendency of the front axle of each truck to lift from the rail and when regenerative or dynamic braking is utilized the rear axle of each truck lifts from the rail, thereby permitting the rear wheels to slip during deceleration of the vehicle.

Various schemes and devices, both mechanical and electrical have been proposed and utilized to limit or prevent wheel slippage from occurring and have been fairly satisfactory in operation. However, all of the schemes of which I am aware have been somewhat complicated and have materially increased the cost of the vehicle equipment.

An object of my invention, generally stated, is to provide a method of correcting for weight transfer in an electrically propelled vehicle which shall be simple and effective in operation and which may be economically manufactured and installed.

A more specific object of my invention is to provide a method of correcting for weight transfer in an electrically propelled vehicle which shall be effective, both when power is being applied to accelerate the vehicle and when the vehicle is being decelerated by regenerative braking.

Other objects of my invention will be explained fully hereinafter or will be apparent to those skilled in the art.

According to one embodiment of my invention, the proper amount of correction for weight transfer in an electrically propelled vehicle is provided by utilizing wheels of a smaller diameter on the front axle of each truck of the vehicle than on the rear axle, each axle being driven by an individual electric motor or motors. As will be more fully explained hereinafter, the motor which drives the smaller wheels will take less than its share of the load during motoring or acceleration and will take more than its share of the load during regeneration, thereby compensating for the transfer of weight occurring during these respective operations and preventing wheel slippage.

As will be apparent from the following description, the same result can be accomplished by the use of different gear ratios on the front and rear axles of each truck as by a corresponding difference in wheel diameter. When it is not desirable or feasible to utilize wheels of a different diameter, the proper amount of compensation for weight transfer can be provided by utilizing a higher gear ratio on the front axle than on the rear axle of each truck of the vehicle.

For a fuller understanding of the nature and objects of my invention, reference may be had to the following detailed description, taken in conjunction with the accompanying drawings, in which:

Figure 1 is a view, in side elevation, of an electrically propelled vehicle embodying my invention;

Fig. 2 is a view of motor performance curves, showing the results accomplished by one embodiment of my invention;

Fig. 3 is a view of curves, similar to those illustrated in Fig. 2, showing the results accomplished by a modification of the invention, illustrated in Figs. 1 and 2;

Figure 4:
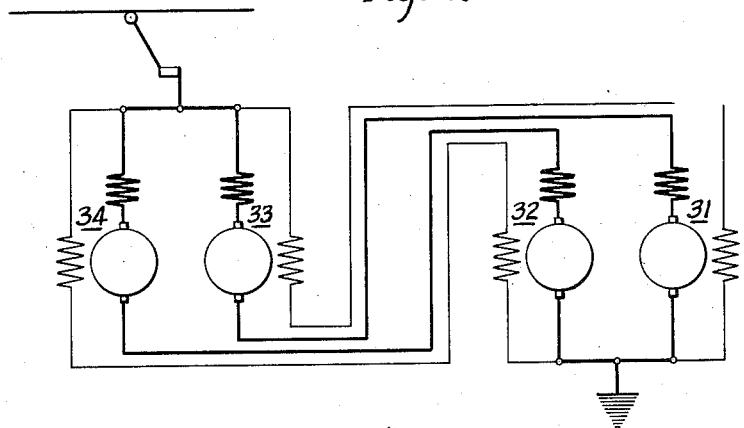
Figs. 4 and 5 are diagrammatic views showing motor connections that may be utilized in practicing my invention.

Referring now to the drawings, and particularly to the structure shown in Fig. 1 and the motor performance curves illustrated in Fig. 2, it will be seen that the motors driving the leading axles 21 and 23, which are equipped with wheels 25 and 27, respectively, of a smaller diameter than the wheels 26 and 28 on the trailing axles 22 and 24, respectively, develop a lower tractive effort than the motors on the trailing axles at any given car speed during motoring or acceleration of the car. Assuming that the car is running at a speed of approximately 9 miles per hour and that the motors are operating with 55 amperes in their shunt field windings, as designated by the points 1 and 2 on the curves "a" and "b", respectively, the motors on the leading axles develop a tractive effort of approximately 1300 pounds and the motors on the trailing axles develop a tractive effort of about 2300 pounds, as designated by the points 3 and 4 on the curves "c" and "d", respectively.

Figure 5:
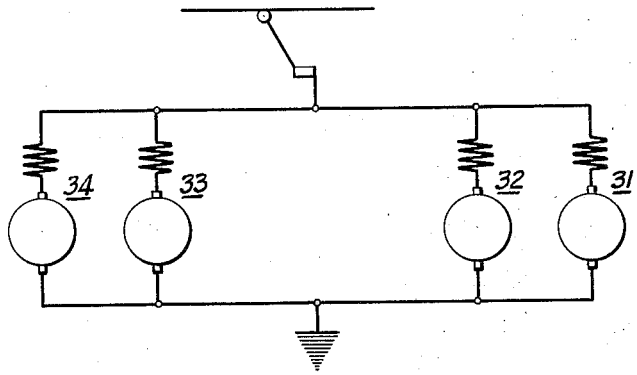
Figure 6:
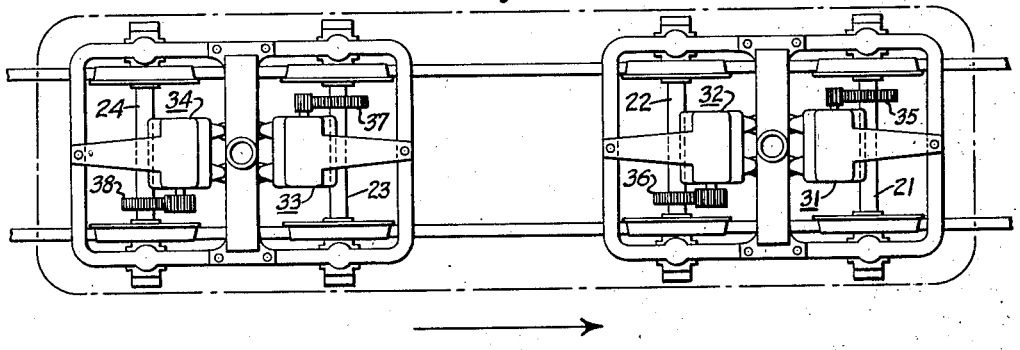
Fig. 6 is a plan view of the modification of the invention to which the curves shown in Fig. 3 apply.

Therefore, the two motors on the leading axles, which become lighter as a result of the weight transfer occurring during acceleration, take less than their share of the load and the tendency towards slipping of the wheels on the leading axles is overcome. Since the motors 31 and 33 on the leading axles 21 and 23, respectively, are connected in series and the motors 32 and 34 on the trailing axles 22 and 24, respectively, are connected in series, and the two groups are connected in parallel to a source of power, common to both groups, the motors driving the smaller wheels revolve at a higher speed than those driving the larger wheels and, therefore, develop a higher counter-electromotive force and take less motoring current, as shown by the curves in Fig. 2. If desired, all of the motors may be connected in parallel across the power source, as shown in Fig. 5.

Likewise, when the motors are regenerating current during regenerative braking of the car, the motors on the leading axles develop a higher tractive effort and take more load than the motors on the trailing axles. Assuming that the car is running at approximately 12 miles per hour, as designated by the points 5 and 6 on the curves "$a$" and "$b$", respectively, the motors on the leading axles develop a tractive effort of about 2200 pounds, while the motors on the trailing axles develop a tractive effort of about 1400 pounds, as designated by the points 7 and 8 on the curves "$e$" and "$f$", respectively.

Since the trailing axle becomes lighter as a result of the weight transfer occurring during deceleration of the car, slipping of the rear wheels is prevented during regeneration as well as slipping of the front wheels during acceleration of the car.

Another advantage of the present system is that the unbalance of load between the motors on the leading and the trailing axles during acceleration is much greater when the motors are operating with 55 amperes shunt field current, which produces the maximum accelerating rate for the particular motor, of the compound type whose performance is represented by the curves illustrated, than at 4 amperes shunt field current, which is the running curve for this motor. The difference in load unbalance results from the steeper speed characteristic with the weak shunt field and is very desirable, since the unbalance in load at normal running speeds should be as small as possible.

From the foregoing description, it is apparent that by properly proportioning the relative wheel sizes of the wheels on the leading and trailing axles of each truck of an electric vehicle, such as a street car, weight transfer compensation can be effected and wheel slippage prevented in a simple and efficient manner, no change in the electrical connections for the motors being necessary.

In case it is undesirable to provide wheels of a different diameter, the use of different gear ratios in the gear units on the front and rear axles of each truck will accomplish the same results as a corresponding difference in wheel diameter. This is evidenced by the following equation:

$$\text{Speed in M. P. H.} = \frac{\text{inches wheel diameter}}{336 \times \text{gear ratio}} \times \text{Motor R. P. M.},$$

from which it will be seen that, for a certain speed of the car, the motor R. P. M. may be increased by either decreasing the wheel diameter or by increasing the gear ratio on the axle driven by the motor.

Therefore, in order to reduce the tractive effort developed by the front axle of each truck during acceleration, gear units 35 and 37 may be utilized on the front axles 21 and 23, respectively, which have a higher ratio than the gear units 36 and 38 on the rear axles 22 and 24, respectively. The performance curves shown in Fig. 3, for a motor of the series type, illustrate the results obtained by providing a different gear ratio. Thus, if the car is running at a speed of approximately 12 miles per hour, as designated by the points 9 and 10 on the curves "$g$" and "$h$", respectively, the motor having a higher gear ratio will develop a tractive effort of about 1700 pounds while the motor having a low gear ratio will develop a tractive effort of about 2000 pounds, as indicated by the points 11 and 12 on the curves "$i$" and "$j$", respectively.

In this manner practically the same results can be accomplished in the way of compensating for weight transfer and preventing wheel slippage as by providing wheels of a different diameter. The proper amount of compensation may be secured by selecting the correct gear ratios to permit the motors to revolve at a difference in speed which will cause a sufficient unbalance in load to prevent wheel slippage.

Since numerous changes may be made in the above-described construction, and different embodiments of the invention may be made without departing from the spirit and scope thereof, it is intended that all matter contained in the above description or shown in the accompanying drawings shall be interpreted as illustrative and not in a limiting sense.

I claim as my invention:

1. In an electric vehicle, the combination with a truck having a leading and a trailing wheeled axle, of a motor for driving each axle, said motors having similar speed and torque characteristics, means for applying the same voltage to each motor, and means for causing the motor on the leading axle to revolve at a higher speed than the motor on the trailing axle, thereby tending to prevent wheel slippage.

2. In an electric vehicle, the combination with a plurality of trucks, each truck having a leading and a trailing wheeled axle, of a motor for driving each axle, said motors having similar speed and torque characteristics, a common source of power for all the motors, and means for causing the motors on the leading axles to revolve at a higher speed than the motors on the trailing axles, thereby tending to prevent wheel slippage.

3. In an electric vehicle, the combination with a pair of trucks, each truck having a leading and a trailing wheeled axle, of a motor for driving each axle, said motors having similar speed and torque characteristics, the motors which drive the leading axles being connected in series and the motors which drive the trailing axles being connected in series, a common source of power for both groups of motors, and means for causing the motors on the leading axles to revolve at a higher speed than the motors on the trailing axles, thereby tending to prevent wheel slippage.

4. In an electric vehicle, the combination with a truck having a leading and a trailing axle, of a motor for driving each axle, said motors having similar speed and torque characteristics and wheels for supporting the axles, the wheels on the leading axle being of a smaller diameter than those on the trailing axle to reduce wheel slippage.

5. In an electric vehicle, the combination with a plurality of trucks, each truck having a leading and a trailing axle, of a motor for driving each axle, said motors having similar speed and torque characteristics, and wheels for supporting the axles, the wheels on the leading axle of each truck being of a smaller diameter than those on the trailing axle to reduce wheel slippage.

6. In an electric vehicle, the combination with a pair of trucks, each truck having a leading and a trailing axle, of a motor for driving each axle, said motors having similar speed and torque characteristics, the motors which drive the leading axles being connected in series and the motors which drive the trailing axles being connected in series, the two groups of motors being connected in parallel, and wheels for supporting the axles, the wheels on the leading axle of each truck being of a smaller diameter than those on the trailing axle, thereby tending to prevent wheel slippage.

7. In an electric vehicle, the combination with a truck having a leading and a trailing wheeled axle, of a motor for driving each axle, said motors having similar speed and torque characteristics, and gear units for transmitting the motor torques to the axles, the gear unit on the leading axle having a higher ratio than the one on the trailing axle, thereby tending to prevent wheel slippage.

8. In an electric vehicle, the combination with a plurality of trucks, each truck having a leading and a trailing wheeled axle, of a motor for driving each axle, said motors having similar speed and torque characteristics, and gear units for transmitting the torque of each motor to its respective axle, the gear units on the leading axles having a higher ratio than those on the trailing axles, thereby tending to prevent wheel slippage.

9. In an electric vehicle, the combination with a pair of trucks, each truck having a leading and a trailing wheeled axle, of a motor for driving each axle, said motors having similar speed and torque characteristics, the motors which drive the leading axles being connected in series and the motors which drive the trailing axles being connected in series, a common source of power for both groups of motors, and gear units for transmitting the torque of each motor to its respective axle, the gear units on the leading axles having a higher ratio than those on the trailing axles, thereby tending to prevent wheel slippage.

SIMEON E. NEWHOUSE.